United States Patent [19]

Shay et al.

[11] Patent Number: 4,485,020

[45] Date of Patent: Nov. 27, 1984

[54] AMINE TREATMENT OF POLYSACCHARIDE SOLUTION

[75] Inventors: Lucas K. Shay; Stephen E. Reiter, both of Bartlesville, Okla.

[73] Assignee: Phillips Petroleum Company, Bartlesville, Okla.

[21] Appl. No.: 523,541

[22] Filed: Aug. 16, 1983

[51] Int. Cl.$^3$ .................. C09K 3/00; C08G 59/40
[52] U.S. Cl. .................. 252/8.55 D; 252/8.55 C; 166/246; 166/275; 536/114
[58] Field of Search .................. 252/8.55 D, 315.3; 536/114; 166/246

[56] References Cited

U.S. PATENT DOCUMENTS

| | | | |
|---|---|---|---|
| 3,342,732 | 9/1967 | Goetz | 252/8.55 D |
| 3,383,307 | 5/1968 | Goetz | 252/8.55 D |
| 3,801,502 | 4/1974 | Hitzman | 252/8.55 D |
| 4,110,226 | 8/1978 | Swawson | 252/8.55 D |
| 4,110,230 | 8/1978 | Hessert et al. | 252/8.55 D |
| 4,110,231 | 8/1978 | Swawson | 252/8.55 D |
| 4,254,257 | 3/1981 | Schroeck | 536/52 |
| 4,440,228 | 4/1984 | Swawson | 166/274 |

OTHER PUBLICATIONS

William H. McNeely and Kang, K. S., in "Industrial Gums, Polysaccharides and Their Derivatives", (Academic Press, 1973), Chapter 21, pp. 486–493.

Primary Examiner—A. Lionel Clingman

[57] ABSTRACT

A thermostable, viscous xanthan polysaccharide solution prepared by the process of heating a xanthan polysaccharide solution in the presence of at least one $C_1$ to $C_{10}$ alkyl or $C_3$ to $C_{10}$ cycloalkyl substituted primary or secondary mono- or diamine having an upper limit of a total of 15 carbon atoms under conditions sufficient to form a thermostable, viscous xanthan polysaccharide solution.

The thermostable, viscous xanthan polysaccharide solution may be used as a mobility buffer in a process for the enhanced recovery of oil.

16 Claims, No Drawings

AMINE TREATMENT OF POLYSACCHARIDE SOLUTION

This invention relates to thickened thermostable biopolymer solutions and a process for preparing same. It also relates to a process for enhanced oil recovery employing the thickened, thermostable biopolymer solutions as mobility buffers.

The transformation of a biopolymer into a viscous, aqueous solution is generally known. It is desirable when preparing an aqueous solution of biopolymer to be able to control the ultimate viscosity of the solution and particularly desirable to be able to increase the viscosity of the solution without using additional biopolymer.

A typical use of biopolymer solutions is in enhanced oil recovery processes to recover oil from subterranean formations. These processes are well known in the petroleum production art. Aqueous biopolymer solutions are injected as mobility buffers to follow an aqueous flooding medium, for example; water, surfactant or other recovery agents to drive oil in the formation to one or more production wells where oil is produced. The tendency of injected water to channel through the aqueous flooding medium and completely bypass portions of the reservoir is a well known problem. The problem has been overcome by the use of viscous solutions of biopolymers as mobility buffers. The latter aid in improving the sweep efficiency of water, surfactants or other oil recovery agents.

One of the problems encountered in the use of biopolymer solutions as mobility buffers is that when they are exposed to formation temperatures, which generally range between about 30° C. to 65° C. (85° F. to 150° F.), they are subject to thermal degradation. Therefore, the viscosities of these biopolymer solutions usually are reduced during enhanced oil recovery. A biopolymer solution which is thermostable at formation temperatures would be highly desirable.

Therefore, one object of this invention is to provide an improved, thermostable biopolymer solution useful as a mobility buffer.

Another object is to provide a process for making an improved biopolymer solution.

Still another object is to provide an improved process for enhanced oil recovery using the improved biopolymer solution as a mobility buffer.

Other aspects, objects, and advantages of this invention are apparent from the specification and claims.

In accordance with the present invention, we have discovered that an improved high viscosity, thermostable biopolymer solution is produced by heating a xanthan polysaccharide solution in the presence of at least one $C_1$ to $C_{10}$ alkyl- or $C_3$ to $C_{10}$ cycloalkyl-substituted primary or secondary mono- or diamine compounds having an upper limit of a total of fifteen carbon atoms.

The biopolymer solutions useful in this invention are solutions of any commercially available polysaccharides produced by the genus Xanthomonas. Such biopolymers are commonly referred to as xanthan gums or xanthan biopolymers. The presently preferred xanthan biopolymer is produced by *Xanthomonas campestris* NRRL B-1459 and can be referred to as simply polysaccharide B-1459. Polysaccharide B-1459 contains D-glucose, D-mannose, and D-glucuronic acid groups in the ratio to 2.8:3.0:2.0. It also contains about 3 to about 3.5 percent by weight pyruvic acid and about 4.7 percent by weight of acetic acid. The acetic acid exists as the O-acetyl ester, whereas the pyruvic acid is attached through a ketal linkage. The polysaccharide B-1459 is typically produced by culturing bacterium *Xanthomonas campestris* NRRL B-1459 deposited with the U.S. Department of Agriculture, Peoria, Ill., on a well-aerated medium having a pH of about 7 containing commercial glucose, organic nitrogen sources, dipotassium hydrogen phosphate, and appropriate trace elements. The preferred fermentation temperature during the culturing is about 28° C. The fermentation reaction is complete in about 96 hours or less. Bacterial cells and suspended impurities are removed from the fermentation product by centrifugation after adjusting the pH to about 5 to 6. The biopolymer B-1459 is precipitated from the centrifuged fermentation product by adding salt and a low molecular weight alcohol thereto.

The biopolymer B-1459 is a relatively standard product. Its molecular weight is estimated to be in the millions. This biopolymer is commercially available under the brand "Xanflood".

A xanthan biopolymer solution may be prepared by placing the biopolymer in any medium, typically water, which will solubilize the polysaccharide.

The amines used in this invention are those selected from the group consisting of either $C_1$ to $C_{10}$ alkyl- or $C_3$ to $C_{10}$ cycloalkyl-substituted (1) primary monoamines, (2) secondary monoamines (3) primary diamines, and (4) secondary diamines, the particular amine used having an upper limit of a total of fifteen carbon atoms.

Generally, the amine used in this invention will be at least one chosen from the following structural formulae:

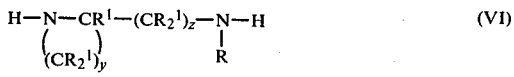

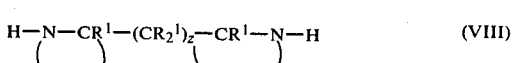

-continued

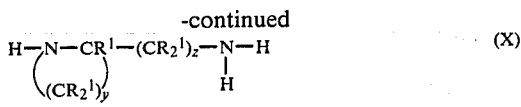

wherein each R independently represents either a $C_1$ to $C_{10}$ alkyl radical or a $C_3$ to $C_{10}$ cycloalkyl radical, each $R^1$ independently represents H, a $C_1$ to $C_{10}$ alkyl radical or a $C_3$ to $C_{10}$ cycloalkyl radical, x represents an integer from 2 to 10, y represents an integer from 1 to 10, and z represents an integer from 0 to 6, with the proviso that the amine contain an upper limit of a total of 15 carbon atoms.

Examples of compounds falling under Formula (I) are methylamine, ethylamine, propylamine, butylamine, pentylamine, cyclohexylamine, hexylamine, heptylamine, octylamine, and mixtures thereof.

Examples of compounds falling under Formula (II) are diethylamine, N-methyl cyclohexylamine, dipropylamine, dibutylamine, N-ethyl cyclohexylamine and mixtures thereof.

Examples of compounds falling under Formula (III) are piperidine, pyrrolidine, 3-methylpiperidine, 4-methylpiperidine and mixtures thereof.

Examples of compounds falling under Formula (IV) are ethylene diamine, propylene-1,3-diamine, hexamethylene diamine, cyclohexane-1,4-diamine and mixtures thereof.

Examples of compounds falling under Formula (V) are N,N'-dimethylhexamethylene diamine, N,N'-dimethylethylene diamine and the like.

Examples of compounds falling under Formula (VI) are 4(methylamino)piperidine, 4(ethylamino)piperidine, 2(methylamino)piperidine and the like.

Examples of compounds falling under formula (VII) are piperazine, 2-methyl piperazine, 2,5-dimethyl piperazine and mixtures thereof.

Examples of compounds falling under formula (VIII) are 4,4'-dipiperidyl methane, 2,2'-bis(4-piperidyl)propane and the like.

Examples of compounds falling under formula (IX) are N-methyl ethylene diamine, N-ethyl ethylene diamine, N-methyl hexamethylene diamine and mixtures thereof.

Examples of compounds falling under formula (X) are 2-aminopiperidine, 3-aminopiperidine, 2-aminopyrrolidine, 3-aminopyrrolidine and mixtures thereof.

The thermostable biopolymer solution of the invention is produced by heating the biopolymer solution in the presence of at least one of the above defined amines under conditions sufficient to form the desired thermostable, viscous biopolymer solution.

Generally, the temperature employed is in the range of about 30° to 130° C., preferably from about 50° to 100° C.

The time employed for heating is generally from about 5 to 120 minutes, preferably about 10 to 40 minutes.

Broadly, from about 10 to 200 wt % and preferably from about 25–100 wt % of the amine is employed based upon the weight of the biopolymer contained in the reaction mixture.

The thermostable biopolymer solutions of this invention may be used as mobility buffers in enhanced oil recovery processes to recover oil from oil-bearing formations. Such processes typically involve injecting a surfactant system into the oil bearing formations via one or more injection wells. A microemulsion takes place in-situ as the injected system contacts the oil in place.

Following injection of the surfactant system, a mobility buffer is injected into the formation. The injected mobility buffer will then aid in improving the sweep efficiency of the surfactant system thereby increasing the total amount of oil recovered from the subterranean formation.

The following Examples illustrate the present invention.

EXAMPLE I

Preparation of Xanthan Biopolymer

Three different xanthan biopolymers employed in the following studies were prepared by inoculating a medium with a composition as described in Table I with *Xanthomonas campestris* NRRL B-1459. Thus, for biopolymer A, 1 L of inoculum was employed, while 100 mL of inoculum was employed for preparation of biopolymers B and C. Conventional aerobic fermentation conditions were employed until the glucose content of the medium was essentially zero. Broth directly from the fermentor was used for the following studies.

Biopolymer content of the fermentation broths was determined by adding 500 mL of 33 vol % denatured alcohol to a 15 mL aliquot of broth. Solution was stirred until homogenous, then centrifuged at about 10,000 g for about 30 minutes. The supernatant was then decanted, and 3.3 g of KCl added to the decantate. Once the KCl had dissolved, 1 L of denatured alcohol was added to precipitate the xanthan biopolymer, which was collected by filtration, then oven dried overnight.

TABLE I

| | Medium | | | | | |
|---|---|---|---|---|---|---|
| Biopolymer | Glucose, g | CPC Corn Steep Liquor, g | MgSO₄·7H₂O, g | 85% H₃PO₄, mL H₂O, L | polymer | % Biopolymer |
| A | 500 | 10.0 | 1.0 | 31.4 | 9 | 3.1 |
| B | 75* | 3.0 | 0.3 | 6.3 | 1.9 | 1.6 |
| C | 60 | 3.0 | 0.3 | 6.3 | 1.9 | 2.2 |

*CPC corn syrup (80% solid) employed

EXAMPLE II

Treatment Studies With Xanthan Biopolymers A and B

One-hundred grams of crude fermentation broth from preparations A and B were treated with varying amounts of several different treating agents, as summarized in Table II. In all cases, samples were cooled to room temperature after the designated treatment period was complete, and sample viscosity was measured using a Brookfield Model LVT viscometer employing an appropriate spindle size, depending on the same viscosity.

TABLE II

| Run | Bio-polymer | Treating Agent, g | | Treatment Time | Temp. °C. | Viscosity, cps |
|---|---|---|---|---|---|---|
| 1 | A | None | | 0 | — | 8400 |
| 2 | A | 2% NaAl$_2$O$_4$, 1.0 | 15 | min 50 | | 9000 |
| 3 | A | CrCl$_3$.6H$_2$O, | 0.01 | 15 min | 50 | 9200 |
| 4 | A | Aniline, | 1.0 | 15 min | 50 | 9800 |
| 5 | A | Et$_2$NH, | 0.7 | 15 min | 50 | 9600 |
| 6 | A | PrNH$_2$, | 0.7 | 15 min | 50 | 9700 |
| 7 | B | None | | 0 | — | 7200 |
| | | | | 15 min | 80 | 6600 |
| | | | | 7 days | 130 | 1000 |
| 8 | B | Aniline, | 2.0 | 15 min | 80 | 6900 |
| 9 | B | Et$_2$NH, | 2.0 | 15 min | 80 | 8300 |
| 10 | B | PrNH$_2$, | 2.0 | 15 min | 80 | 8600 |
| | | | | 7 days | 130 | 8800 |

The results of these experiments demonstrate that the inventive biopolymer treatment even under very mild conditions (50° C. for only 15 minutes) gives at least 15% improvement in biopolymer broth viscosity (see Runs 4, 5, 6). In addition, the enhanced viscosity achieved is maintained over at least one week of heating at 130° C. (see Run 10).

EXAMPLE III

Treatment Studies With Biopolymer C

Fifty grams of crude fermentation broth C was diluted with 50 grams of North Burbank Brine, then treated with various amounts of several treating agents, for varying periods of time, as summarized in Table III. Samples tested over an extended period of time were cooled to room temperature, viscosity measured as described above, then returned to the incubator for further heat treatment.

TABLE III

| Run | Treating Agent, | g | Treatment Time | Temp, °C. | Viscosity, cps |
|---|---|---|---|---|---|
| 1 | None (Control) | — | — | — | 2800 |
| | | | 15 min | 75 | 3100 |
| | | | 5 days | 130 | 45 |
| | | | 21 days | 130 | 1 |
| 2 | Undecylamine, | 1.6 | 15 min | 75 | ppt.* |
| 3 | Dodecylamine, | 1.6 | 15 min | 75 | ppt. |
| 4 | Cyclohexylamine, | 1.6 | 15 min | 75 | 5700 |
| | | | 5 days | 130 | 4000 |
| | | | 21 days | 130 | 3000 |
| | | | 40 days | 130 | 2500 |
| 5 | Ethylenediamine, | 1.8 | 15 min | 75 | 5300 |
| | | | 5 days | 130 | 2880 |
| | | | 21 days | 130 | 1250 |
| | | | 40 days | 130 | 1500 |
| 6 | 1,3-Propanediamine, | 1.8 | 15 min | 75 | 4800 |
| | | | 5 min | 130 | 2600 |
| | | | 21 days | 130 | 2550 |
| | | | 40 days | 130 | 1700 |
| 7 | 1,6-Hexanediamine, | 2.0 | 15 min | 75 | 4300 |
| | | | 5 days | 130 | 3000 |
| | | | 21 days | 130 | 2500 |
| | | | 40 days | 130 | 2400 |
| 8 | Heptylamine, | 1.6 | 15 min | 75 | ppt. |
| | | 0.8 | 15 min | 75 | 4300 |
| | | | 5 days | 130 | 200 |
| | | | 21 days | 130 | 67 |

*Biopolymer precipitated upon treating agent addition and heating.

The results of these experiments demonstrate that biopolymer viscosities are increased by the inventive treatment (Runs 2-8), in some instances by as much as a factor of 2 (Run 4). The treated biopolymer solutions retain their improved viscosity properties during extended exposure to heat. Note that in the case of heptylamine (Run 8), relatively smaller amounts of such are suggested for use as compared to other amine and diamine compounds.

Reasonable variations and modifications are possible from the foregoing disclosure without departing from the scope and spirit of this invention.

We claim:

1. A thermostable, viscous xanthan polysaccharide solution prepared by heating a xanthan polysaccharide solution in the presence of at least one C$_1$ to C$_{10}$ alkyl- or C$_3$ to C$_{10}$ cycloalkyl substituted primary or secondary mono- or diamine having an upper limit of 15 total carbon atoms, wherein said xanthan polysaccharide solution is heated in the presence of said mono- or diamine at a temperature in the range of about 30° to about 130° C. from about 5 minutes to 120 minutes.

2. A xanthan polysaccharide solution according to claim 1 wherein said polysaccharide is B-1459.

3. A xanthan polysaccharide solution according to claim 1 wherein said monoamine or diamine is one selected from the group consisting of:

(a) a compound of the formula:

(b) a compound of the formula:

(c) a compound of the formula:

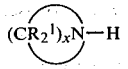

(d) a compound of the formula:

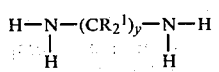

(e) a compound of the formula:

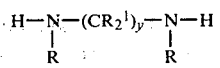

(f) a compound of the formula:

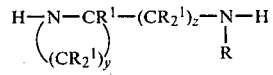

(g) a compound of the formula:

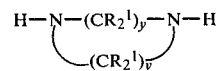

(h) a compound of the formula:

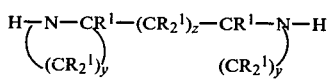

(i) a compound of the formula:

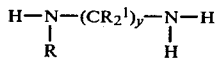

(j) a compound of the formula:

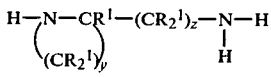

wherein each R independently represents either a $C_1$ to $C_{10}$ alkyl radical or $C_3$ to $C_{10}$ cycloalkyl radical, each $R^1$ independently represents either H, a $C_1$ to $C_{10}$ alkyl radical or a $C_3$ to $C_{10}$ cycloalkyl radical, x represents an integer from 2 to 10, y represents an integer from 1 to 10, and z represents an integer from 0 to 6, with the proviso that the amine contain an upper limit of a total of 15 carbon atoms.

4. A xanthan polysaccharide solution according to claim 3 wherein said monoamine or diamine is one selected from the group consisting of propylamine, cyclohexylamine, diethylamine, ethylenediamine, propylene-1,3-diamine, and hexamethylenediamine.

5. A xanthan polysaccharide solution according to claim 1 heated in the presence of from about 10 to 200 weight percent of said mono- or diamine.

6. A xanthan polysaccharide solution according to claim 5 heated in the presence of from about 25 to 100 weight percent of said mono- or diamine.

7. A process for the production of a thermostable, viscous xanthan polysaccharide solution comprising heating a xanthan polysaccharide solution in the presence of at least one $C_1$ to $C_{10}$ alkyl or $C_3$ to $C_{10}$ cycloalkyl substituted primary or secondary mono- or diamine containing an upper limit of 15 total carbon atoms wherein said xanthan polysaccharide solution is heated in the presence of said mono- or diamine at a temperature in the range of 30° C. to 130° C. from about 5 minutes to 120 minutes.

8. A process according to claim 7 wherein said xanthan polysaccharide is B-1459.

9. A process according to claim 7 wherein said monoamine or diamine is one selected from the group consisting of:

(a) a compound of the formula:

(b) a compound of the formula:

(c) a compound of the formula:

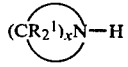

(d) a compound of the formula:

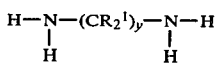

(e) a compound of the formula:

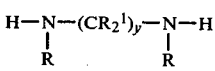

(f) a compound of the formula:

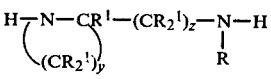

(g) a compound of the formula:

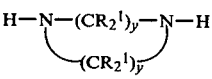

(h) a compound of the formula:

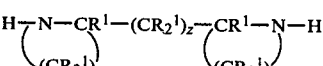

(i) a compound of the formula:

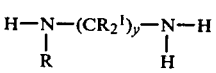

(j) a compound of the formula:

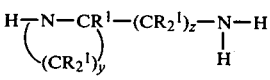

wherein each R independently represents either a $C_1$ to $C_{10}$ alkyl radical or $C_3$ to $C_{10}$ cycloalkyl radical, each $R^1$ independently represents either H, a $C_1$ to $C_{10}$ alkyl radical or a $C_3$ to $C_{10}$ cycloalkyl radical, x represents an integer from 2 to 10, y represents an integer from 1 to 10, and z represents an integer from 0 to 6, with the proviso that the amine contain an upper limit of a total of 15 carbon atoms.

10. A process according to claim 7 wherein said monoamine or diamine is one selected from the group consisting of propylamine, cyclohexylamine, diethylamine, ethylenediamine, propylene-1,3-diamine, and hexamethylenediamine.

11. A process according to claim 7 wherein said xanthan polysaccharide solution is heated in the presence of from about 10 to 200 weight percent of said mono- or diamine.

12. A process according to claim 11 wherein said xanthan polysaccharide solution is heated in the presence of from about 25 to 100 weight percent of said mono- or diamine.

13. In a process for the enhanced recovery of oil employing a mobility buffer, the improvement which comprises using as the mobility buffer a thermostable, viscous polysaccharide solution prepared by the process of heating a xanthan polysaccharide solution in the presence of at least one $C_1$ to $C_{10}$ alkyl- or $C_3$ to $C_{10}$ cycloalkyl substituted primary or secondary mono- or diamine wherein said xanthan polysaccharide solution is heated in the presence of said mono- or diamine at a temperature in the range of 30° C. to 130° C. from about 5 minutes to 120 minutes.

14. A xanthan polysaccharide solution according to claim 13 wherein said polysaccharide is B-1459.

15. A xanthan polysaccharide solution according to claim 13 wherein said monoamine or diamine is one selected from the group consisting of:

(a) a compound of the formula:

(b) a compound of the formula:

(c) a compound of the formula:

(d) a compound of the formula:

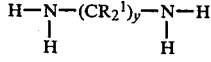

(e) a compound of the formula:

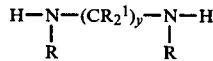

(f) a compound of the formula:

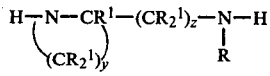

(g) a compound of the formula:

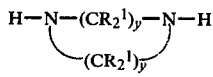

(h) a compound of the formula:

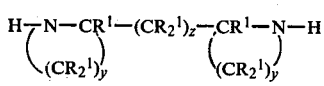

(i) a compound of the formula:

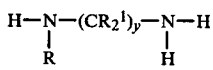

(j) a compound of the formula:

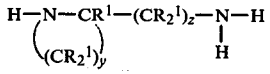

wherein each R independently represents either a $C_1$ to $C_{10}$ alkyl radical or $C_3$ to $C_{10}$ cycloalkyl radical, each $R^1$ independently represents either H, a $C_1$ to $C_{10}$ alkyl radical or a $C_3$ to $C_{10}$ cycloalkyl radical, x represents an integer from 2 to 10, y represents an integer from 1 to 10, and z represents an integer from 0 to 6, with the proviso that the amine contain an upper limit of a total of 15 carbon atoms.

16. A xanthan polysaccharide solution according to claim 13 wherein said monoamine or diamine is one selected from the group consisting of propylamine, cyclohexylamine, diethylamine, ethylenediamine, propylene-1,3-diamine, and hexamethylene diamine.

* * * * *